2,716,122
Patented Aug. 23, 1955

2,716,122

N-SUBSTITUTED-4-BENZHYDRYL ETHER-PIPERIDINES

Joseph Levy, Paramus, N. J., Saul Chodroff, Brooklyn, N. Y., and Roland Kapp, Newark, N. J., assignors to Nopco Chemical Company, Harrison, N. J., a corporation of New Jersey No Drawing. Continuation of application Serial No. 154,733, April 7, 1950. This application October 19, 1953, Serial No. 387,062

3 Claims. (Cl. 260—294.7)

This application is a continuation of application Serial No. 154,733, now abandoned.

This invention relates to antispasmodic and anesthetic compounds and more particularly to new and improved antispasmodic and anesthetic compounds of the benzhydryl ether type.

It is the object of this invention to provide new compounds having antispasmodic and anesthetic activity.

A further object of the invention is to provide improved antispasmodic and anesthetic compounds.

Other objects of the invention will in part be obvious and will in part appear hereafter.

We have discovered that compounds having the general formula:

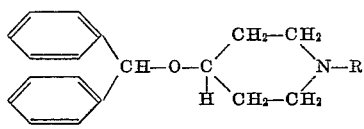

wherein R is selected from the group consisting of aryl, aralkyl, cycloalkyl and heterocyclic are highly effective antispasmodic agents. Also these compounds have anesthetic properties.

The compounds of our invention can be prepared by reacting a benzhydryl halide with the desired N-substituted piperidinol, or with a sodium or potassium derivative of the desired N-substituted piperidinol; or the compounds can be prepared by reacting benzhydryl alkoxide such as a sodium or potassium derivative thereof with an N-substituted-4-halopiperidine. Preferably we prepare the compounds of our invention by reacting a benzhydryl halide with an N-substituted piperidinol in the presence of a tertiary amine the radicals of which each contain at least three carbon atoms as disclosed and claimed in the copending application Serial No. 154,731 of Joseph Levy. Details of this process may be found in the aforesaid application and in the detailed working examples which are given hereinafter to illustrate a method for the preparation of our new compounds.

Illustrative but not limiting examples of the new compounds of our invention are the following:

(1)

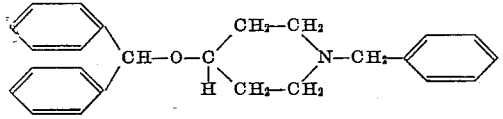

(2)

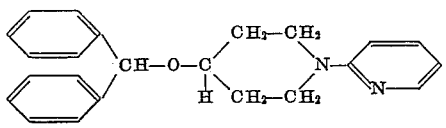

(3)

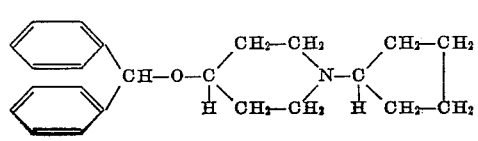

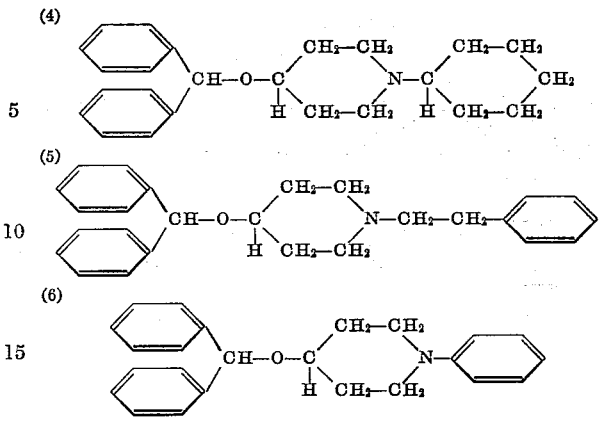

The new compounds of our invention may be administered as such or in the form of their acid addition salts. Suitable acid addition salts are the hydrochlorides, hydrobromides, citrates, maleates, tartrates, succinates, sulfates, phosphates, etc.

The new compounds of our invention are readily converted to quaternary ammonium derivatives by reaction with suitable alkyl ar aralkyl halides or sulfates.

The following examples are merely illustrative of a method for producing the compounds of our invention and are not to be construed in a limiting sense.

Example I

The benzhydryl ether of 1-cyclohexyl-4-piperidinol was prepared by refluxing a mixture of 7 grams of 1-cyclohexyl-4-piperidinol (0.038 mol), 18.5 grams of benzhydryl bromide (0.075 mol), 9.27 grams of tributylamine (0.05 mol) and 25 ml. of methyl isobutyl ketone for four hours. Crystallization of the hydrobromide salt of benzhydryl ether took place after about one hour of refluxing. The reaction mixture was cooled, the crystalline hydrobromide salt of the benzhydryl ether filtered therefrom and washed with cold methyl isobutyl ketone. The hydrobromide salt of the desired benzhydryl ether was obtained in a yield of 16.4 grams which was 100% of the theoretical yield. The product was made up of colorless needles having a melting point of 228–231° C. On recrystallization from isopropanol, a yield of 93% of the pure hydrobromide salt melting at 232°–234° C. was obtained. The hydrochloride salt of the benzhydryl ether was prepared and it was found to have a melting point of 230°–232° C. The free base had a melting point of 58–60° C.

Example II 4.78 grams of 1-benzyl-4-piperidinol (0.025 mol), 7.58 grams of benzhydryl chloride (0.0375 mol) and 4.64 grams of tributylamine (0.025 mol) were heated at 150–155° C. for five hours. A heavy crystalline precipitate formed within an hour. At the end of the five hour heating period, 25 ml. of methyl isobutyl ketone were admixed with the mixture and the mixture then refluxed for half an hour. Thereafter the mixture was chilled to 5° C. and filtered and the crystalline hydrochloride salt of the benzhydryl ether washed with methyl isobutyl ketone. The desired ether was obtained in a yield of 90% of theory. Recrystallization of the hydrochloride salt of the ether from isopropanol gave 7.82 grams (81% of theory) of colorless needles melting at 246–248° C. The free base had a melting point of 77–79° C.

Having described our invention what we claim as new and desire to secure by Letters Patent is:

1. A compound of the class consisting of a free base and its acid addition salts, said free base having the structural formula:
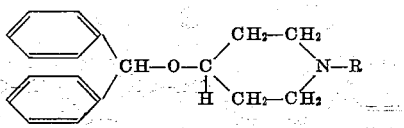
wherein R is selected from the group consisting of benzyl and cyclohexyl radicals.
2. The compound having the formula:
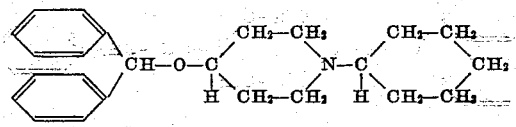
3. The compound having the formula:
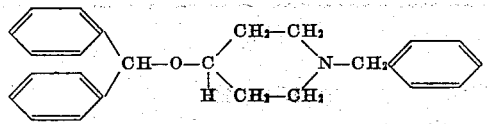
References Cited in the file of this patent
UNITED STATES PATENTS
2,479,843    Knox  ---------------- Aug. 23, 1949